Patented Sept. 17, 1946

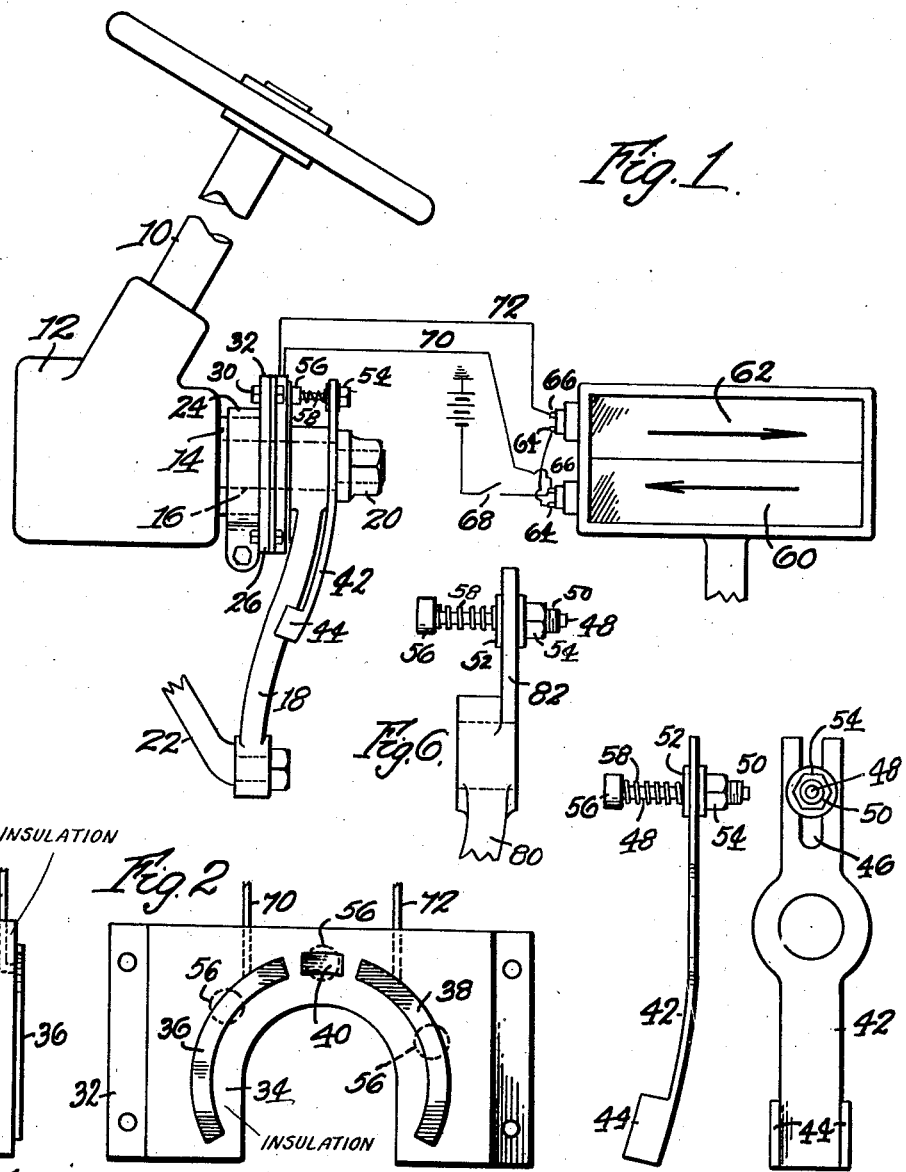

2,407,934

UNITED STATES PATENT OFFICE 2,407,934

AUTOMATIC DIRECTION INDICATOR

Frederick W. Nilson, Worcester, Mass.

Application October 17, 1942, Serial No. 462,320

1 Claim. (Cl. 200—59)

This invention relates to direction indicators particularly adapted for motor vehicles such as automobiles, busses, trucks, etc.

Objects of the invention include the provision of a completely automatic direction indicator for motor vehicles for indicating turns to be made by the vehicle, whether in turning a corner or curve, passing, parking, etc.; the provision of a fully automatic visible direction indicator of a comparatively simple construction which is however foolproof, and direct and positive in actuation and wherein the slightest turn of the steering gear serves to operate the indicator; and the provision of a fully automatic visible direction indicator for motor vehicles wherein the operator of the vehicle not only need not but cannot operate the indicator except by turning the steering wheel, so that the mechanism cannot be disarranged or made ineffective by the operator, and the indicator does not depend on any conscious operation on the part of the operator.

Further objects of the invention include the provision of electrically lighted right and left direction indicating arrows to be mounted at the rear or front or both of a motor vehicle, lead wires from the battery of the vehicle to one side of each light, and an on-and-off ground connection for said lights at the other sides thereof, said ground connection including an element secured to or forming a part of a movable member, the latter being moved through a reduction gear by the steering gear shaft of the vehicle, to contact either side of the separate ground contacts for the separate lights, whereby either arrow is lighted up separately by a slight turn of the steering wheel, but the movable member which forms a part of the ground or circuit closer for both lights, moves only through a small distance as compared to the movement of the steering wheel, thus providing a simple but positive automatic direction indicator.

Other objects and advantages of the invention will appear hereinafter.

Reference is to be had to the accompanying drawing in which

Fig. 1 is a view in side elevation of an embodiment of the invention and showing the electric circuits in diagrammatic form;

Fig. 2 is a front elevation of the ground contact plate;

Fig. 3 is a view in side elevation of the plate of Fig. 2;

Fig. 4 is a front elevation of the movable ground contact;

Fig. 5 is a side elevation of the contact of Fig. 4;

Fig. 6 shows a modified type of movable ground contact; and

Fig. 7 is a rear elevation of the ground contact plate support.

The drawing in this case illustrates a preferred form of the invention, but it is to be understood that many modifications and rearrangements of the parts and circuits may be made without departing from the scope of the appended claim.

In Fig. 1, the numeral 10 indicates a steering gear wheel shaft such as is conventional in motor vehicles, this shaft entering a gear reduction box 12 containing any desired form of usual steering gear reduction means. The gear reduction box is ordinarily bolted in some convenient manner to a frame member of the vehicle so that it is fixed relative thereto. A boss 14 extends outwardly of box 12 to journal or carry a sector shaft 16, and as is well understood in the art, the sector shaft will be turned as the steering gear wheel shaft 10 is turned but to a greatly reduced amount, the ratio being for instance 15 or 20 to 1.

Sector shaft 16 has a pitman arm 18 secured thereto in fixed relation as by a nut 20 so that the pitman is oscillated about the sector shaft as a center as the steering shaft 10 is rotated. A tie rod 22 is pivotally connected to the pitman arm. This tie rod is connected in the usual manner, not shown, to the steering arms and thereby to the steering knuckles of the front wheels of the vehicle.

In the embodiment of the invention here illustrated, a bracket 24 is clamped about the boss 14 by a bolt or other means, so as to fix an attached plate 26 transversely to the boss and sector shaft 16. Plate 26 is apertured at 28 to receive bolts 30 extending through a contact plate 32, so that the latter is fixedly mounted thereby on the boss 14, or in other words, to housing 12.

Contact plate 32 carries a thickness of electrical insulation as at 34, this insulation being disposed at the side of the contact plate opposite from the housing 12. Two elongated contacts 36, 38 are set into the insulation, these contacts being curved along arcs which define a circle of which the axis of the sector shaft 16 is the center, and as shown, these contacts extend outwardly of the insulation to a slight degree. A dummy element 40 between the adjacent ends of the contacts provides a bridge therebetween for the moving ground contact to be described.

A plate or bracket 42, which as shown is elongated and bent to conform to the shape of the pitman arm 18, is adapted to be applied to the latter as by means of nut 20 which clamps it to the pitman arm. A pair of ears 44 or other means may be provided to prevent relative movement of plate 42 and the pitman arm, so that as the steering wheel shaft 10 is rotated, plate 42 will oscillate together with the pitman arm.

Plate 42 is provided with a slot 46 for the reception of a metal rod or pin 48 which is held thereto by any convenient means. Pin 48 is arranged to axially slide transversely to plate 42, and as shown, is slidably mounted in a threaded ferrule 50 which is clamped to the plate 42 by fixed abutment 52 and a nut 54. A head 56 is formed on one end of pin 48 for sweeping contact with the contacts 36, 38 and the dummy 40, and a spring 58 maintains the head in such contact.

A pair of arrows 60, 62 are arranged in or on the vehicle body at any point and these arrows may be mounted in a license plate holder together or they may be separated. In any case there is a separate lamp for each arrow and each lamp has two contacts 64, 66, contacts 64 being connected through the motor, headlight, or other switch 68 to the battery. The other lamp contacts 66, are connected separately to separate wires 70, 72, and the wire 70 is connected to one contact, as 36, in plate 32, and the other wire 72, is connected to contact 38.

The operation of the device will be clear from the above description. Switch 68 being closed, or absent, and the steering wheel shaft 10 being turned, the pitman arm 18 and plate 42 are correspondingly rocked but to a much smaller degree. Such being the case, the spring-pressed pin 48 makes contact with either contact 36 or 38 and the lamp to which this contact is connected lights its arrow, because it is now grounded. The steering wheel shaft 10 may be rotated several times, but the ground contact will not be broken unless the vehicle wheels are returned to a straight ahead condition wherein pin 48 contacts only the dummy 40. The various positions of pin head 56 are shown in dotted lines in Fig. 2.

It is to be noted that the smaller the gap between contacts 36 and 38, the sharper will be the action, and it is contemplated that the change from one contact to the other as by the pin 48 may be so quick as to light the indicator at any deviation from a straight line of the front wheels of the vehicle.

A modified swinging ground contact is shown in Fig. 6, this comprising the pitman arm 80 having an integral contact holding element 82 instead of the separate member 42, but the pin 48 and spring 58 are substantially the same. It is recognised and made a part of this invention that the arcuate contacts 36, 38 may be mounted in cooperative relation thereto on any moving part of the steering gear which moves by influence of the steering wheel but at a reduced rate and distance. The apparatus should of course be enclosed in a housing not shown to exclude dirt, etc., and the lamps may be built into the vehicle body or made in a separate unit, or the lamps may be separated, for instance on either fender, front or rear, or on the body of the vehicle in spaced condition

Having thus described my invention and the advantages thereof, I do not wish to be limited to the details herein disclosed, otherwise than as set forth in the claim, but what I claim is:

A switch comprising a plate, segmental spaced contacts on the plate, a collar fixed to the plate said collar adapted to be disposed about a relatively fixed part of a vehicle, means to tighten the collar for quick attachability, an arm provided with an aperture intermediate its ends to receive an associated fixed vehicle part for pivotal movement thereon, a sweeping contact arranged adjacent one end of the arm, means yielding urging the sweeping contact into selective engagement with the segmental contacts, means on the arm adapted to engage a movable vehicle part so that the arm is pivoted thereby, said means and arm being detachable.

FREDERICK W. NILSON.